Jan. 6, 1970     H. A. McMASTER     3,488,173
METHOD AND APPARATUS FOR HEAT TREATING AND
CONVEYING GLASS SHEETS ON A
GAS SUPPORT BED
Filed July 7, 1966     2 Sheets-Sheet 2
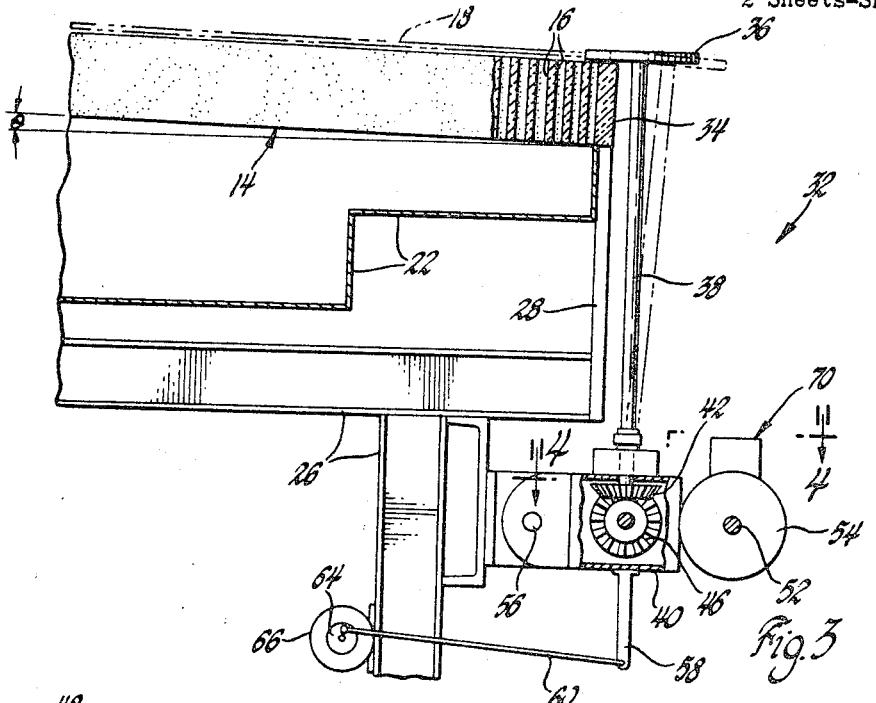
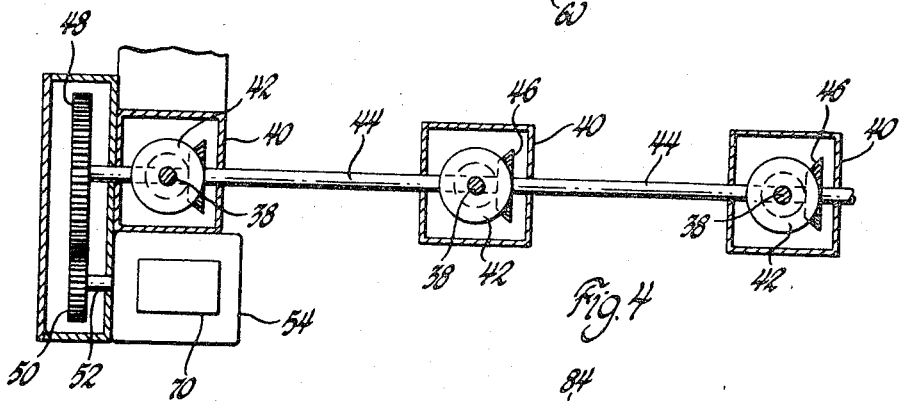
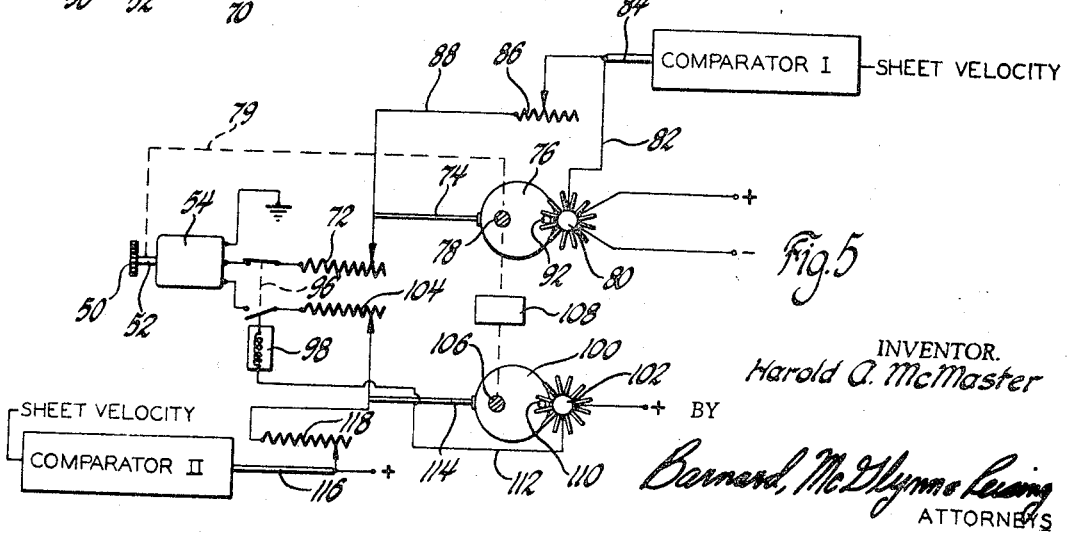
INVENTOR.
Harold A. McMaster
BY
Bernard, McGlynn e Leising
ATTORNEYS United States Patent Office 3,488,173
Patented Jan. 6, 1970

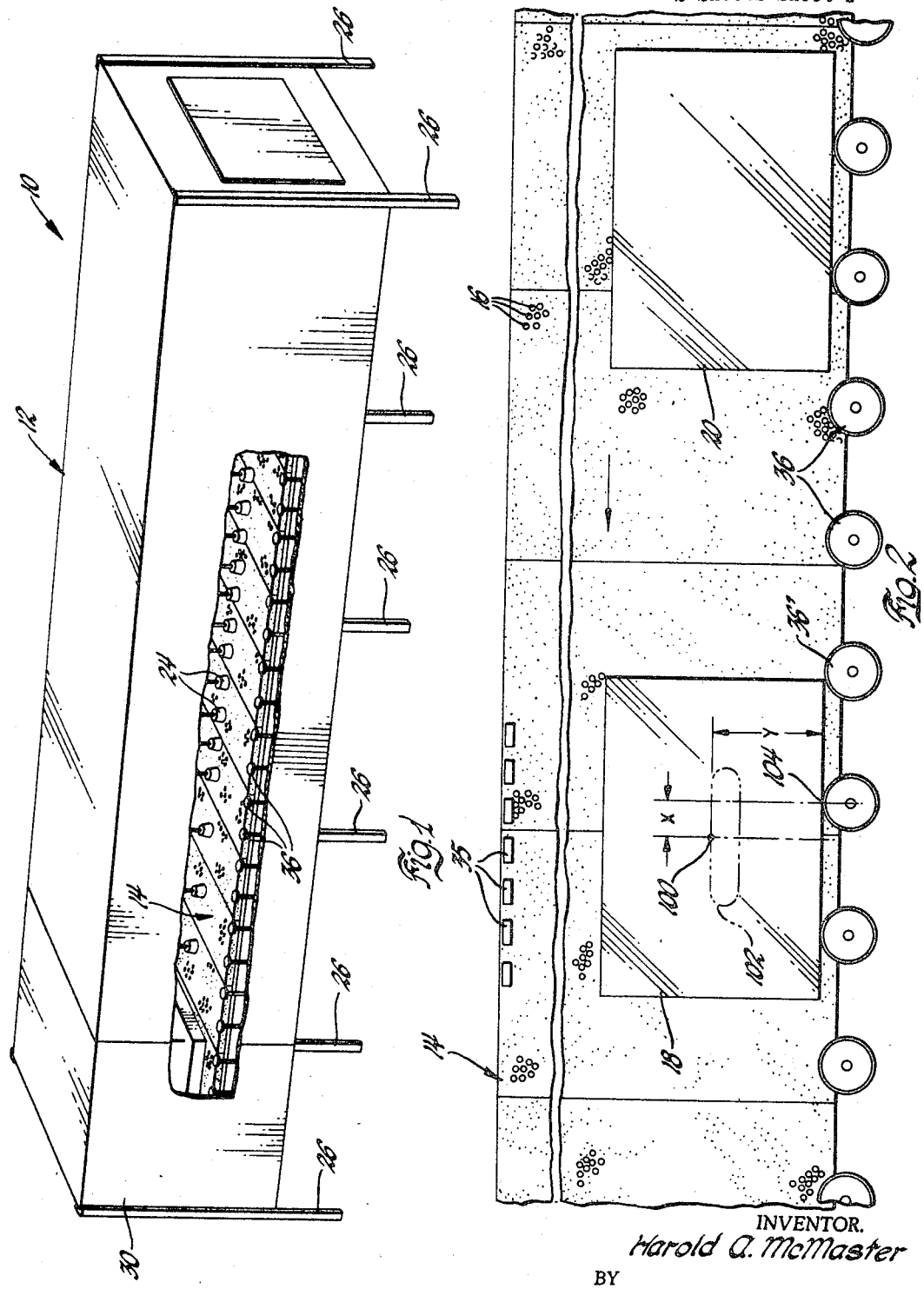

3,488,173
METHOD AND APPARATUS FOR HEAT TREATING AND CONVEYING GLASS SHEETS ON A GAS SUPPORT BED
Harold A. McMaster, Woodville, Ohio, assignor to Permaglass Inc., Woodville, Ohio, a corporation of Ohio
Filed July 7, 1966, Ser. No. 563,443
Int. Cl. C03b 25/04
U.S. Cl. 65—25                                                 18 Claims

ABSTRACT OF THE DISCLOSURE

A method and apparatus for conveying a sheet of glass along a gas support bed and transferring heat between the sheet and the glass at a controlled rate to sequence the movement of the conveying means to move a sheet of glass between first and second spaced positions along the gas support bed by first imparting a constant acceleration to the sheet and thereafter imparting a constant deceleration to the sheet, and including means to determine the velocity of the sheet at spaced positions along the support bed for signalling the control means to maintain the velocity of the sheet at predetermined values at the respective spaced positions along the support bed. In addition, there may be included an actuation means for oscillating the conveying means in a direction transversely of the longitudinal axis of the support bed as the sheet is oscillated along the support bed.

---

This invention relates to a method and apparatus for treating sheets of glass.

A superior quality of glass is obtainable utilizing a recent major development in the treating of sheet glass wherein sheets of glass are floated on gases while being heated for annealing, tempering and/or curving and the like. Such treatment is accomplished by an elongated furnace having an elongated bed supported within the furnace with passages in the bed for supplying hot gases over the upper surface of the bed to support the sheets on the gases as the sheets move along the bed by a conveyor.

As the sheet of glass is moved along the bed while floating on the hot gases, it is heated to a temperature sufficient for bending and/or for tempering or annealing. Devices of this type are more specifically described and illustrated in U.S. patent 3,223,501 which isued Dec. 14, 1965, and in U.S. patent 3,332,759 which issued July 25, 1967 in the names of Harold A. McMaster and Norman C. Nitschke and assigned to the assignee of the instant invention.

Various features of the instant invention are applicable to various well-known glass treating and conveying apparatuses; however features of the instant invention are particularly applicable to situations where a sheet of glass is floated along a bed on a blanket of hot gases as described above. As a sheet of glass is moved along a bed by a conveyor means while floating on a blanket of hot gases emitted from passage in the bed, as disclosed in the above-noted patents, the sheet of glass must be moved relatively rapidly over the bed to avoid streaking or isolated hot spots in the sheets. These streaks and isolated hot spots result from the impingement on the sheets of the spaced fluid flows being emitted from the passages in the bed. At the same time, however, the sheet of glass must be subjected to a high temperature for a sufficient time to allow the sheet of glass to reach the desired temperature for either curving or tempering. Since a sheet of glass which is treated in this manner must be moved along the bed at least at some predetermined relatively rapid velocity and must be subjected to high temperatures for a sufficient time to reach the desired temperature, the length of the bed, hence the length of the furnace, is determined by these two variables.

Therefore, when floating sheets of glass are moved at a constant velocity along a bed while being heated, the furnace necessary to accomplish such treatment is very long. One of the prime problems with such furnace is, of course, that an extremely long furnace is very expensive to fabricate. Even so, a very long furnace is satisfactory when the demand for the sheets of glass is high enough that the furnace may be substantially continuously operated with the sheets placed in a series to float along the bed one after another. However, when the demand for the sheets of glass is far below the capacity of such a long furnace the furnace must be frequently shut down or operated very inefficiently by increasing the distance between the sheets of glass floating along the bed.

Accordingly, it is an object and feature of this invention to provide a method of treating glass so that an apparatus comprising a greatly shortened furnace and bed may be fabricated to treat glass by floating the glass on fluid over the bed, thus greatly reducing the cost of the furnace and providing a furnace which can be efficiently operated at capacity for long periods.

Another object and feature of this invention is to provide an improved method for conveying a sheet of glass between spaced positions.

By moving the respective sheets of glass in this manner, a greatly shortened furnace may be fabricated at a greatly decreased cost as compared to known furnaces and the furnace may be efficiently operated for long periods of time at full capacity.

Other objects and attendant advantages of this invention will be readily appreciated as the same becomes better understood by reference to the following detailed description when considered in connection with the accompanying drawings wherein:

FIGURE 1 is a perspective view of a preferred embodiment of the instant invention;

FIGURE 2 is a fragmentary plan view showing sheets of glass being moved over an elongated bed while being treated;

FIGURE 3 is an enlarged fragmentary cross-sectional view taken substantially along line 3—3 of FIGURE 2;

FIGURE 4 is a cross-sectional view taken substantially along line 4—4 of FIGURE 3; and FIGURE 5 is a schematic view of a sequencing means which may be utilized in the instant invention.

Referring now to the drawings, wherein like numerals indicate like or corresponding parts throughout the several views, an apparatus for treating a sheet of glass in accordance with the instant invention is generally shown at 10. The apparatus 10 includes an elongated furnace, generally indicated at 12, and a blasthead 30. An elongated bed is disposed within the furnace 12 and is generally indicated at 14. The bed 14 may have a curved portion for curving the sheets of glass, such a curved portion being illustrated in the aforementioned Patent 3,332,759.

The bed 14 has a plurality of spaced passages 16 therein for supplying fluid such as hot gases above the bed to support the sheets of glass 18 and 20. The bed preferably also includes exhaust passages spaced among the inlet passages 16. Hence, hot gases are circulated through the furnace by blowers in a manner as set forth in the above-mentioned Patent 3,332,759. The hot gases are directed upwardly through the passages 16 in the bed 14 by the ductwork 22. A plurality of burners or heaters 24 are disposed above the bed for radiantly heating the sheets of glass and for heating the hot gases being circulated within the furnace.

The furnace is supported by the structural members 26, the bed 14 being supported by a plurality of upright members 28. The bed may also be supported in a manner such as that disclosed in U.S. Patent 3,281,329 which issued Oct. 25, 1966 in the name of Harold A. McMaster.

As illustrated in FIGURE 3, the bed 14 is tilted at an angle $\theta$ with a horizontal plane about its longitudinal axis. The bed 14 extends the entire length of the furnace 12 and preferably into the blasthead 30. The bed also preferably extends out of the furnace to form a loading station, such as that illustrated in the aforementioned Patent 3,332,759. The blasthead subjects the sheets of glass to cool gases for tempering or annealing the sheets of glass. Such a blasthead is disclosed in the aforementioned application Ser. No. 326,713.

There is also included conveying means, generally shown at 32, which is disposed adjacent the low edge 34 of the bed 14 for conveying the sheet of glass along the bed as the sheet is supported on fluid and heat is transferred between the fluid and the sheet. More specifically, the conveying means 32 includes a plurality of rollers 36, each of which has a portion disposed above the upper surface of the bed 14 for engaging the edges of the sheets 18 and 20. Each roller 36 is disposed on the upper end of a shaft 38 and each shaft 38 is rotatably supported in a gear box 40. A bevel gear 42 is attached to the lower end of each shaft 38. A shaft 44 extends through the respective gear boxes 40 and has secured thereto a plurality of bevel gears 46 which respectively engage the bevel gears 42. A driven spur gear 48 is secured to the shaft 44 and engages the driving spur gear 50. The driving spur gear 50 is disposed on the shaft 52 of a motor 54. Upon activation of the motor 54, the driving spur gear 50 rotates the driven spur gear 48 and the driven spur gear 48 in turn rotates the shaft 44 and the bevel gears 46 to rotate the respective bevel gears 42 and shafts 38 so that the respective rollers 36 rotate to move the floating sheets of glass along the bed. Any number of gear boxes 40 may be operatively associated with one driving motor 54.

The respective gear boxes 40 are pivotally mounted by the pin 56 to the support structure of the furnace. An arm 58 is rigidly secured to one of the gear boxes 40 and extends downwardly therefrom and has a crank arm 60 pivotally connected thereto at 62. The other end of the crank arm 60 is attached to a rotating wheel 64 and the wheel 64 is driven by the motor 66, the operation of which will become clear hereinafter.

A control means, generally shown at 70, is included for sequencing the rotary movement of the rollers 36 to impart a constant acceleration to the respective sheets of glass to move the sheets a first distance along the bed and to thereafter impart a constant deceleration to the respective sheets of glass as they are moved a second distance along the bed. A schematic of the control means 70 is illustrated in FIGURE 5 in combination with the motor 54, the motor 54 being a reversible electric motor. Electric current is supplied through the rheostat 72 to the motor 54 and the position of the arm 74 determines the power applied to the motor 54 and hence determines the rotational speed of the motor 54. The arm 74 is moved by a cam 76 which is rotated by the shaft 78. The shaft 78 is rotatably driven by the motor 54 through appropriate gearing which is not shown but is illustrated schematically by the line 79. The electric power from either a negative or positive source is supplied through the switch 80, the line 82, the arm 84, the rheostat 86, and the line 88 to the rheostat 72. The position of the switch 80 determines the polarity of the motor 54, thus determines the direction of rotation of the motor 54. The switch 80 is a multiple position rotary switch having an even number of radial fingers 90. Upon each revolution of the cam 76, the finger 92 extending from the cam engages one of the fingers of the switch 80 to index the switch to change the voltage applied to the motor 54, thus changing the direction of rotation of the motor 54. It will be noted that during each revolution of the cam 76, the arm 74 moves back and forth along the rheostat 72 to vary the speed of rotation of the motor 54 during each revolution of the cam 76.

There is also included a means preferably taking the form of a comparator 94 which in turn moves the arm 84 for a secondary regulation of the power supplied to the motor 54, thus providing a secondary regulation of the speed of rotation of the motor 54. The actual velocity of the respective sheets of glass at predetermined positions along the bed 14 is determined by way of a plurality of electric eyes 35 disposed along the bed 14 and a signal representing the actual velocity of the sheet of glass is fed to the comparator 94. As an alternative, a tachometer may be operatively connected to one of the shafts such as shaft 44 to determine its rotary velocity and hence the velocity of the sheet of glass and an encoder may be operatively connected to such a shaft to determine the angular position of the shaft and hence the position of the sheet; thusly, the velocity and position of the sheet may be determined. Also, other appropriate means may also be utilized to determine the velocity of the sheets at predetermined positions along the bed. The sheet of glass is programmed so that it should move at a constant acceleration and a constant deceleration so as to be at a predetermined velocity at a predetermined position along the length of the bed 14 and the comparator compares the actual velocity of the sheet of glass to the desired velocity and in the event the velocity of the sheet of glass is either high or low, the comparator moves the arm 84 accordingly to adjust or regulate the speed of the motor 54 which in turn adjusts or regulates the rotational speed of the rollers 36. In this manner, the acceleration and deceleration of each respective sheet of glass is maintained substantially at the predetermined desired constant value as the sheet moves along the bed. Therefore, the velocity of each sheet of glass is a function of the distance the sheet has moved from a predetermined position along the bed and is not a function of the time the sheet has been moving along the bed.

The sheets of glass 18 and 20 as shown in FIGURE 2 are, therefore, floated on fluid above the bed 14 and engage the respective rollers 36. The rollers 36 are first rotated counterclockwise by the motor 54 as it is supplied a plus voltage through the switch 80 to move the respective sheets of glass 18 and 20 from respective first positions toward a second position in the direction of the arrow. The cam 76 is shaped such that the arm 74 is moved so as to gradually increase the rotational speed of the rollers 36 during the first half of a revolution of the cam 76 (i.e., as the cam rotates from the position illustrated in FIGURE 5) thereby to impart a constant acceleration to the respective sheets of glass 18 and 20 as they move along the bed in the direction of the arrow from the respective first positions toward the respective second positions. When the cam 76 begins the second half of revolution (i.e., 180° from the position shown in FIGURE 5), the arm 74 is moved so as to decrease the rotational speed of the motor 54 which in turn decreases the rotational speed of the rollers 36 to impart a constant deceleration to the respective sheets of glass 18 and 20 as they move to the second position. The sheets of glass, therefore, each move along the bed in the direction of the arrow from a first position to a second position and during the first half of such movement, a constant acceleration is imparted to the sheets and during the second half of such movement, a constant deceleration is imparted to the sheets. Once the cam 76 has made a complete revolution, the pin 92 contacts one of the fingers 90 on the switch 80 to index the switch 80 to switch the voltage applied to the motor 54 from plus to negative, thus reversing the direction of rotation of the motor 54 so that the rollers 36 then rotate in a clockwise direction. In a like manner, the sheets of glass 18 and 20 are moved from the respective second positions in a direction opposite to the arrow toward the respective first positions under a constant acceleration during the first half the distance and under a constant deceleration during the second half the distance. As the cam 76 rotates, therefore, each sheet of glass is oscillated between first and second spaced positions along the bed by alternately imparting to the sheets a constant acceleration and a constant deceleration.

After the respective sheets of glass 18 and 20 have been oscillated between first and second positions, which define an oscillating station along the bed, for a predetermined time (e.g., the time required to heat a sheet to a predetermined temperature), additional means is included in the control means 70 for moving the respective sheets of glass past the second position by first imparting a constant acceleration thereto and then imparting a constant deceleration thereto so that each sheet moves to a new oscillating station along the bed and is thereafter oscillated between respective third and fourth positions. This is accomplished by way of the double pole switch 96, which is actuated by the solenoid 98, the cam 100, the switch 102, and the rheostat 104. The cam 100 is rotated by a shaft 106 which in turn is driven by the shaft 78 through a reduction gear box and/or clutching device 108, which is shown schematically in FIGURE 5. The gear box 108 is such that the cam 100 rotates one revolution during a predetermined plurality of rotations of the cam 76. For example, the cam 76 may rotate sixteen revolutions for each revolution of the cam 100. A sheet of glass is oscillated back and forth between spaced positions as the cam 76 rotates a number of revolutions, and such oscillation continues until the cam 100 makes a complete revolution and the pin 110 contacts one of the fingers of the switch 102 to rotate the switch 102 for activating the solenoid 98 through the line 112 to move the switch 96 out of the position shown in FIGURE 5 so that power flows through the rheostats 118 and 104 to the motor 54 and power is prevented from flowing through the rheostat 72 to the motor 54. As the cam 100 rotates during the first half of a revolution from the position shown in FIGURE 5, the motor 54 increases its rotational speed to move the glass sheets along the bed past the second position under a constant acceleration and during the second half of rotation of the cam 100 the sheets continue to move along the bed but under a constant deceleration. When the cam 100 has made one complete revolution, a finger of the switch 102 is again engaged by the pin 110 to index the switch which cuts the power supplied through line 112, thereby deactivating the solenoid 98 so that power again flows through the rheostat 72 to oscillate the sheet of glass between the third and fourth positions, i.e., a second oscillating station spaced along the bed from the first oscillating station. The sheet of glass is therefore oscillated at a first oscillating station, then moved to a second oscillating station and oscillated again, then moved to a third oscillating station and oscillated again, and so on until the sheet has traveled the entire length of the bed.

In addition, the velocity of the sheet is determined at predetermined positions as the sheet moves between the first oscillating station and the second oscillating station in a manner as hereinbefore described in that a signal is fed into a second comparator having an arm 116 which moves along the rheostat 118 to control the power input to the motor 54 as the sheet moves between one oscillating station and another to maintain the acceleration and deceleration constant as the sheet of glass moves between respective oscillating stations.

Although the respective sheets of glass 18 and 20 may be oscillated only linearly longitudinally along the bed between spaced positions, there is also included an actuation means comprising the aforementioned motor 66, wheel 64, crank arm 60, and arm 58 for oscillating the rollers 36 of the conveying means 32 in a direction transverse to the longitudinal axis of the bed 14 so that the respective sheets of glass 18 and 20 move circuitously between the spaced positions along the bed. More specifically, the center of gravity of the sheet 18 is indicated at 100 in FIGURE 2 and the dash line 102 indicates the circuitous path in which the center of gravity of the sheet 18 moves as it is being oscillated back and forth between spaced positions along the bed. This circuitous path is a result of compounding oscillation longitudinally of the bed, which is accomplished by rotation of the rollers 36, and oscillation transversely of the longitudinal axis of the bed, which is accomplished by pivotal movement of the gear boxes 40 about the shafts 56 to oscillate the rollers 36 in a direction transversely of the longitudinal axis of the bed. By regulating the two oscillations, other circuitous paths such as figure eights may be followed by the respective sheets.

As alluded to above, the velocity of the sheets of glass as they are being moved along the bed while supported on fluid emitted from the passages 16 is critical in that in the event a sheet of glass is moved along a bed at a constant velocity which is too slow, imperfections in the glass may result due to non-uniform heat transfer between the fluid and the glass. In addition, it is frequently necessary, especially in the treatment of very large sheets of glass, to move the sheets of glass from the heat of the furnace into the cooling medium of the blasthead very rapidly to prevent non-uniform cooling which in turn causes breakage or iridescence. In oscillating the glass, therefore, it is desirable to impart the highest possible maximum velocity to the glass while it is being oscillated over a particular station along the bed. In accordance with the instant invention, therefore, a sheet of glass may be most efficiently moved between spaced positions by moving the sheet from the first position toward the second position under a constant acceleration over half the distance and thereafter moving the sheet under a constant deceleration during the second half of the distance such that the deceleration is substantially equal to the negative value of the acceleration. The maximum acceleration which may be applied to a sheet of glass, however, has been found to be limited by various factors. For example, a sheet of glass which has been heated to deformation temperature cannot be moved with an acceleration sufficient to impart forces to the glass which deform the glass. Additionally and referring to FIGURE 3, the sheet of glass 18 is floating on gases above the bed 14 such that it is disposed at an angle $\theta$ whereby a component of force due to the weight of the sheet of glass urges the sheet of glass 18 against the rollers 36 and this component of force due to the weight of the glass establishes sufficient frictional contact between the rollers 36 and the edge of the sheet of glass 18 so that the sheet of glass 18 is moved along the bed 14 upon rotation of the rollers 36. The angle $\theta$, therefore, must be sufficient to provide a sufficient component of force due to the weight of the sheet of glass 18 to urge the sheet of glass 18 against the rollers 36 to establish sufficient frictional contact between the rollers 36 and the sheet of glass so that there is no slippage between the sheet of glass and the rollers 36. On the other hand, this component of force which urges the sheet of glass 18 against the rollers 36 must not be sufficient to cause deformation of the edge of the sheet of glass 18 when it has been heated to deformation temperature. If there is not sufficient frictional contact between a sheet of glass 18 and the rollers 36, however, a high degree of rotational acceleration of the rollers 36 will cause slippage between the rollers 36 and the edge of the sheet of glass 18. Thus, the amount of acceleration which may be applied to the sheet of glass in a function of the component of the force resulting from the weight of the sheet of glass 18 which urges the sheet of glass 18 against the rollers 36. Furthermore, if the acceleration imparted to the sheet of glass 18 by the rollers 36 is too high, the sheet of glass 18 will tend to rotate or roll backward opposite to its direction of movement. That is, if the sheet of glass is being accelerated in the direction of the arrows indicated in FIGURE 2 and the acceleration being imparted to the sheet of glass 18 is too high, the sheet of glass will tend to rotate in a clockwise direction with the lower edge of the sheet moving away from the forward rollers.

Applicant has discovered that these factors are taken into account and that the maximum acceleration imparted to a sheet of glass 18 by the rollers 36 may be determined with the formula:

$$GX/Y \sin \theta$$

G equals acceleration due to gravity, $\theta$ equals the angle of tilt of the bed 14 about its longitudinal axis as indicated in FIGURE 3. X equals the minimum possible distance for any position of a sheet of glass along the bed measured in a direction longitudinally along the bed between the center of gravity 100 of the sheet and the most rearward contact 104 between the sheet and the rollers 36 of the conveying means. That is, as illustrated in FIGURE 2, X indicates the distance longitudinally along the bed measured between the center of gravity 100 of the sheet of glass and the rearwardmost contact 104 between the sheet of glass and any one of the rollers 36, the rearward contact 104 meaning rearward of the direction of movement of the sheet and as illustrated in FIGURE 2 the sheet 18 is moving in the direction of the arrow. Of course, this distance X varies as the sheet of glass moves along the bed; however, it is the minimum value of X which is controlling. The value of X is also determined by the size of the sheet of glass and the spacing of the rollers 36. As illustrated in FIGURE 2, the minimum possible distance for X occurs just when the lower edge of the sheet of glass 18 moves out of contact with the roller 36', which is illustrated in FIGURE 2. Y equals the distance measured in the direction transverse to the longitudinal axis of the bed between the rearward contact 104 and the center of gravity 100 of the sheet, as illustrated in FIGURE 2. A preferable tilt angle $\theta$ for the bed 14 is 5°, and if such is utilized by way of example with a sheet of glass 18 forty-four inches long and thirty inches wide with the rollers spaced ten inches apart, the minimum value for X that can be reached for any position of the sheet of glass during its movement along the bed is twelve inches and the value for Y is fifteen inches; thus, by inserting these parameters into the formula $$(32.2 \text{ ft./sec.}^2)(12 \text{ in.})(0.087)(15 \text{ in.})$$

the maximum acceleration which may be imparted to the sheets of glass is 2.24 ft./sec.$^2$. In a like manner, the deceleration must not exceed the negative of the value of the acceleration determined by the formula.

It has also been discovered that the acceleration imparted to the glass when moving it between spaced positions longitudinally of the bed cannot be satisfactorily implemented by way of well-known mechanical devices such as the wheel and crank 64 and 60 illustrated in FIGURE 1. Mechanical devices which might be utilized to oscillate the glass would be excessively large and cumbersome in order to attain the length of stroke desired and in addition develop inaccurate strokes due to wear and inertia of the system. That is to say, after such mechanical systems have been in use, the position of the glass cannot be accurately controlled in that the distance of the stroke may vary, and such inaccuracies are not compatible with the precise positioning of the glass which is necessary in most glass treating apparatuses. Furthermore, most mechanical oscillating devices produce a sinusoidal curve when velocity is plotted against distance and when utilizing a given maximum acceleration, an approximately forty (40%) greater maximum velocity is attainable by applying a constant acceleration as applicant teaches as compared to devices producing such a sinusoidal curve.

In addition, applicant has found that sheets of glass cannot be effectively moved in a manner that the velocity of the sheet is a function of the time the sheet has been moving because the sheet cannot be precisely positioned or oscillated between precise positions, i.e., the stroke of the movement of the sheets extends beyond and does not reach the necessary predetermined positions. Hence applicant has determined that the effective manner to move a sheet of glass is to make the velocity of the sheet a function of the distance the sheet has traveled from a predetermined initial position. Thus, the position of the sheet is precisely controlled as is the velocity of the sheet at predetermined positions of movement which in turn prevents excessive forces from being applied to the sheet of glass as by rapidly decelerating a sheet of glass to make sure the sheet stops at a necessary predetermined position.

It will be understood that the control means illustrated for imparting the oscillatory movement to the respective sheets of glass are merely illustrative and various other means may be utilized. For example, a conveyor which moves along the edge of the bed and has fingers or the like extending transversely of the bed to engage the sheet of glass may be moved to oscillate the sheet of glass. When utilizing such a conveying means, the X distance is determined by the position of the fingers in contacting the edge of the sheet of glass. In addition, the wheel 64 and crank assembly 60 is one of various devices which may be utilized to impart the oscillatory movement of the rollers 36 transversely to the longitudinal axis of the bed 14 and if such oscillatory movement has a sufficiently long stroke, it is preferable to utilize a device which also imparts a constant acceleration and a constant deceleration to the glass as it moves transversely to the longitudinal axis of the bed. It will be understood that the broad features of the instant invention are also applicable to various other environments wherein sheets of glass must be moved and/or oscillated between spaced positions.

The invention has been described in an illustrative manner and it is to be understood that the terminology which has been used is intended to be in the nature of words of description rather than of limitation.

The embodiments of the invention in which an exclusive property or privilege is claimed are defined as follows:

1. In a method of heat treating a discrete sheet of glass wherein the sheet is supported on fluid supplied over an elongated bed as an exchange of heat is effected between the sheet and the fluid and the sheet is conveyed along the bed by a conveying means, the improvement comprising: sequencing said conveying means and operating said conveying means for moving the sheet from a first position under a constant acceleration and subsequently moving the sheet to a second position under a constant deceleration to prevent deformation of the sheet and maintaining the sheet in driven engagement with the conveying means.

2. In a method as set forth in claim 1 including controlling the conveying means in accordance with the velocity of the sheet at predetermined positions along the bed so that the velocity of the sheet is dependent upon the distance the sheet has moved along the bed.

3. In a method as set forth in claim 2 including sensing the velocity of the sheet at said predetermined positions.

4. In a method as set forth in claim 1 including oscillating the sheet back and forth between said first and second positions by imparting said constant acceleration and said constant deceleration thereto, and simultaneously oscillating the sheet transversely of the oscillation between said first and second position so that the sheet moves circuitously between the first and second positions.

5. In a method as set forth in claim 1 wherein the bed is tilted about its longitudinal axis at an angle with a horizontal plane and the conveying means contacts the sheet at the low longitudinal edge of the bed and further defined as maintaining the acceleration of the sheet below a value obtained by the formula $$GX \sin \theta / Y$$

where: G equals acceleration due to gravity, $\theta$ equals said angle of tilt of the bed about its longitudinal axis, X equals the minimum distance for any position of the sheet along the bed measured in a direction longitudinally along the bed from the most rearward contact between the conveying means and the sheet to the center of gravity of the sheet, and Y equals the distance measured in a direction transverse to the longitudinal axis of the bed between said rearward contact with the conveying means and the center of gravity of the sheet; and maintaining the deceleration substantially equal to a negative value of the acceleration.

6. In a method as set forth in claim 5 including controlling the conveying means in accordance with the velocity of the sheet at predetermined positions along the bed so that the velocity of the sheet is dependent upon the distance the sheet has moved along the bed from said first position.

7. In a method as set forth in claim 5 including oscillating the sheet back and forth between first and second predetermined positions by imparting said constant acceleration and said constant deceleration thereto.

8. In a method as set forth in claim 7 including simultaneously oscillating the sheet transversely of the oscillation between the first and second predetermined positions so that the sheet moves circuitously between the first and second positions.

9. In a method as set forth in claim 1 wherein said bed extends from a heating environment into a cooling environment and further defined as moving the sheet from said heating environment into said cooling environment while under said acceleration and said deceleration.

10. In an apparatus of the type for heat treating a discrete sheet of glass and including an elongated bed with means supplying fluid thereover for supporting a sheet and effecting a heat exchange between the sheet and the fluid and conveying means for contacting and moving the sheet along the bed, the improvement comprising: control means for sequencing said conveying means and including means operating said conveying means to move the sheet from a first position under a constant acceleration and subsequently to move the sheet to a second position under a constant deceleration to prevent deformation of the sheet and maintain the sheet in driven engagement with the conveying means.

11. In an apparatus as set forth in claim 10 including means to maintain said deceleration equal to the negative of said acceleration.

12. In an apparatus as set forth in claim 10 including means for supplying signals to said control means which are a function of the velocity of the sheet for maintaining the velocity of the sheet as a function of its position.

13. In an apparatus as set forth in claim 10 wherein said bed is tilted at an angle with a horizontal plane about the longitudinal axis thereof and said conveying means contacts the sheet adjacent the low edge of the bed for conveying the sheet along the bed and further defined as including means for maintaining said deceleration equal to the negative of said acceleration and acceleration below a value obtained by the formula;

$$GX \sin \theta / Y$$

wherein: G equals acceleration due to gravity, $\theta$ equals said angle of tilt of the bed about its longitudinal axis, X equals the minimum distance for any position of the sheet along said bed measured in a direction longitudinally along said bed from the most rearward contact between the sheet and said conveying means to the center of gravity of the sheet, and Y equals the distance measured in a direction transverse to the longitudinal axis of said bed between said rearward contact and the center of gravity of the sheet.

14. In an apparatus as set forth in claim 13 wherein said control means includes means for oscillating the sheet between first and second positions along said bed by alternately imparting said acceleration and deceleration thereto, and actuation means for oscillating said conveying means transversely of the longitudinal axis of said bed so that the sheet moves circuitously between said first and second positions.

15. In an assembly of the type for controlling the velocity of a sheet of glass as a function of the distance the sheet is conveyed through a heat treating apparatus which includes conveying means for moving the sheet through the apparatus, the improvement comprising; drive means for driving said conveying means to impart movement to the sheet, means for determining the velocity of the sheet at various positions as the sheet moves through the apparatus, and control means responsive to said means for controlling the velocity input to said conveying means by said drive means at predetermined velocity values for said various positions of the sheet.

16. In an apparatus as set forth in claim 15 wherein said means for determining the velocity of the sheet includes means for sensing the velocity of the sheet as it moves along the bed.

17. In a method for controlling the velocity of a sheet of glass as a function of the distance the sheet is conveyed through a heat treating apparatus which includes conveying means for moving the sheet through the apparatus, the improvement comprising; driving the conveying means to impart a movement to the sheet, determining the velocity of the sheet at various positions as the sheet moves through the apparatus, and controlling the velocity input to said conveying means in response to the velocity of the sheet and at predetermined velocity values for the various positions of the sheet.

18. In a method as set forth in claim 17 including sensing the velocity of the sheet as it moves through the apparatus and controlling the velocity input to said conveying means in accordance therewith.

References Cited

UNITED STATES PATENTS

| | | | |
|---|---|---|---|
| 2,131,406 | 9/1938 | Mosmieri et al. | 65—349 |
| 3,223,501 | 12/1965 | Fredley et al. | 65—25 |

ARTHUR D. KELLOGG, Primary Examiner

U.S. Cl. X.R.

65—114, 119, 163, 182, 350, 351

UNITED STATES PATENT OFFICE
CERTIFICATE OF CORRECTION

Patent No. 3,488,173          Dated January 6, 1970

Inventor(s)  Harold A. McMaster

It is certified that error appears in the above-identified patent and that said Letters Patent are hereby corrected as shown below:

Column 1, line 59 "passage" should be --passages--.
Column 7, lines 13 and 14 the formula reading "GX/Y sin θ"          should read          --GX sin θ/Y--

Column 8, line 70 "position" should be --positions--.

SIGNED AND
SEALED
JUL 21 1970

SEAL)
Attest:

Edward M. Fletcher, Jr.
Attesting Officer

WILLIAM E. SCHUYLER, JR.
Commissioner of Patents